July 18, 1933.  G. A. SZABO  1,918,672
GASOLINE GAUGE
Filed June 17, 1932
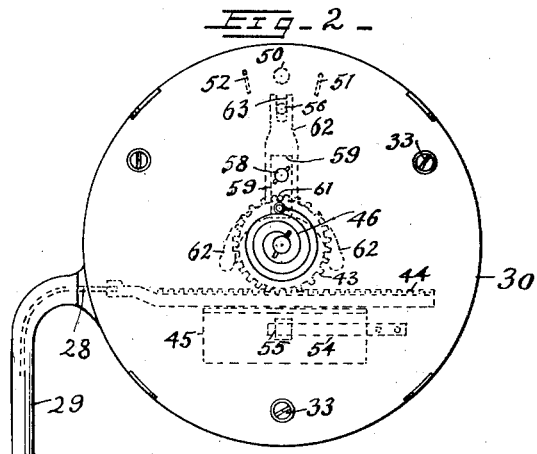
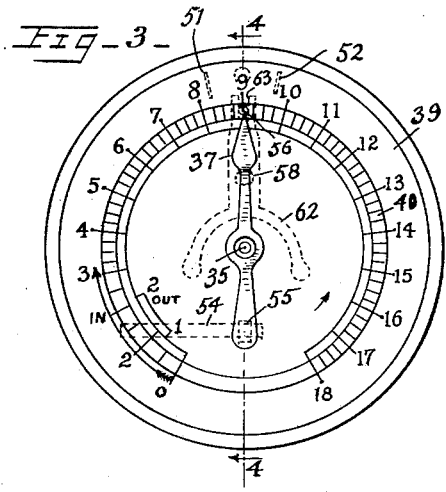
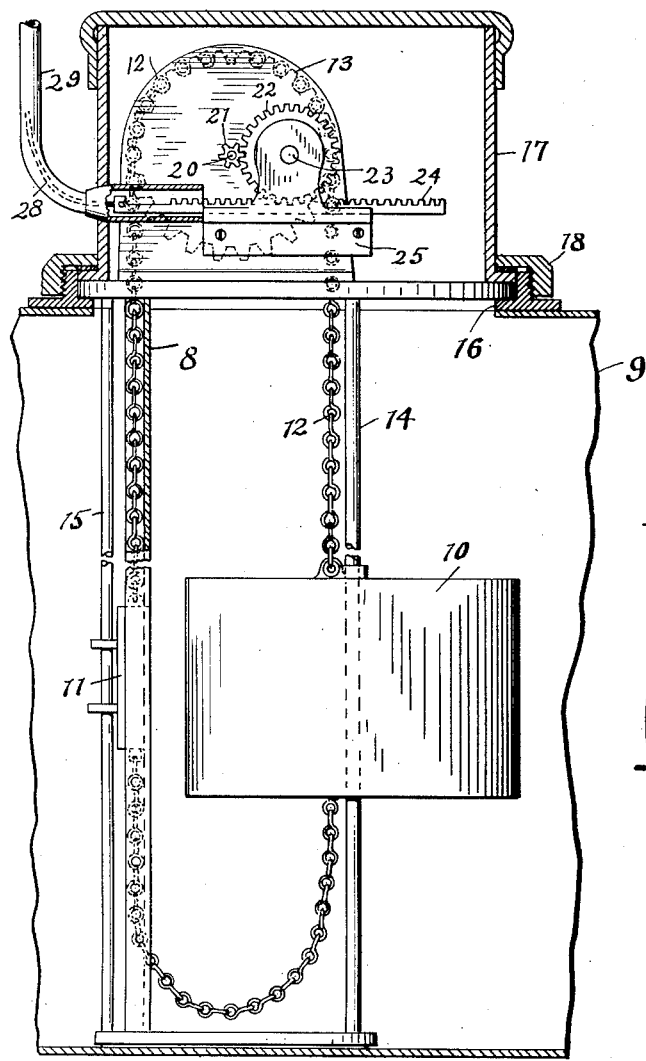
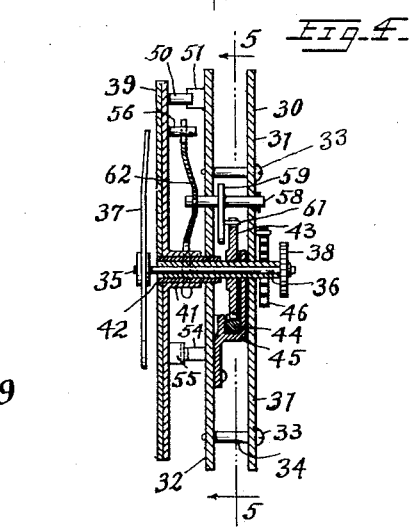
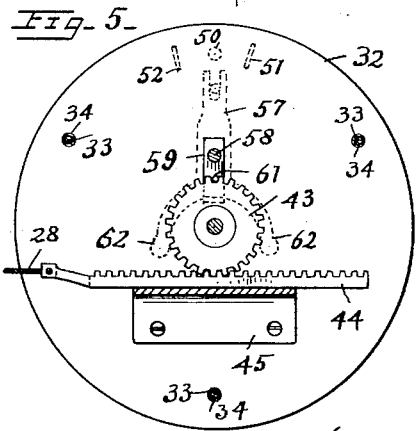
Inventor.
GEORGE A. SZABO.
Kwis Hudson & Kent
Attys.

Patented July 18, 1933

1,918,672

UNITED STATES PATENT OFFICE

GEORGE A. SZABO, OF CLEVELAND, OHIO

GASOLINE GAUGE

Application filed June 17, 1932. Serial No. 617,702.

The present invention relates to gauges and more particularly to a gasoline gauge adapted to be installed in an automobile for the purpose of giving a visual indication of the amount of gasoline in the gasoline tank.

In ordinary gasoline gauges of the type referred to, a certain error is inherent in the indicated reading because of the inability of the float to accurately follow the level of the gasoline in the gasoline tank, due to the weight thereof required to overcome the load including friction of the operating mechanism. After gasoline is put into the gasoline tank, removal of about the first gallon ordinarily produces no movement of the indicator, this amount being necessary to build up sufficient weight in the float to overcome the load of the operating mechanism. The same condition also exists in filling the tank, where it is not uncommon for the first gallon put in the tank to produce no movement of the indicating instrument.

An object of the present invention is the provision of a novel gasoline gauge which will be free from the objections above noted and which will give an accurate indication of the amounts of gasoline in the gasoline tank.

Another object of the invention is the provision of a novel gauge of the type referred to which will give an accurate indication of the amount of gasoline in the gasoline tank and in which both the hand and dial of the indicating instrument will be movable.

Further objects and advantages of the invention will be apparent to those skilled in the art from the following description of the preferred embodiment thereof described in connection with the accompanying drawing, in which:

Figure 1 is a section, with portions in elevation, showing the float assembly;

Fig. 2 is a rear view of the indicating instrument adapted to be installed on the instrument board of an automobile;

Fig. 3 is a front view of the instrument illustrated in Fig. 2;

Fig. 4 is a section with portions in elevation on the line 4—4 of Fig. 3, looking in the direction of the arrows; and Fig. 5 is a section on the line 5—5 of Fig. 4 looking in the direction of the arrows.

The invention may be summarized as comprising a float assembly adapted to be installed in the gasoline tank of an automobile, and an indicating instrument adapted to be installed on the instrument board operatively connected together by a flexible coupling, such as a Bowden wire.

Referring to the drawing, see Fig. 1, the float assembly comprises a frame designated in general by the reference character 8 supported in any suitable manner in a gasoline tank 9. A float 10 connected to a counterweight 11 by a sprocket chain 12 which passes over a sprocket wheel 13 is adapted to follow the level of the gasoline in the tank 9. The float 10 and the counterweight 11 are guided in their vertical movement by guide rods 14 and 15 respectively, which constitute a part of the frame 8. In the embodiment of the invention illustrated the frame 8 is suspended from the top of the gasoline tank 9 in a suitable aperture 16, the entire float assembly being covered by a metal cover 17 and held in its assembled relation by a nut 18.

The sprocket wheel 13 is keyed to a shaft 20 rotatably supported in the frame 8, which shaft also carries a pinion 21 keyed thereto and continuously in mesh with a gear 22 rotatably supported on a short shaft 23 also rotatably supported in the frame 8. A rack 24 slidably supported in a bracket 25 fixed to the frame 8, is continuously in mesh with the gear 22 and is attached to one end of a flexible connection comprising a flexible wire 28 enclosed in a small flexible covering 29. The other end of the flexible connection is connected to the indicating instrument hereinafter referred to. From the description, it will be apparent that as the gasoline level in the tank 9 is varied, the float 10 will be raised or lowered, causing the sprocket chain 12 to rotate the sprocket wheel 13 and through the reduction gears 20 and 22, move the rack 24.

The indicating instrument comprises a frame designated in general by the reference character 30 adapted to be installed on the instrument board of an automobile in any suitable manner. The frame 30 comprises two disks 31 and 32 connected together by screws 33 and held in predetermined spaced relation by short tubular members 34. A shaft 35 projecting through a tubular member 36 carries a pointer 37 on one end thereof and a knurled knob 38 on the opposite end. The shaft 35 engages the tubular member 36 with a forced fit but may be moved relative thereto by turning the knob 38 to set the pointer 37 on zero when installing the device. A dial 39 provided with a suitable scale or graduations 40 and a hub 41 is rotatably supported on a tubular member 42 fixed to the disk 32 and constituting a part of the frame 30.

The pointer 37 is moved over the dial 39, through the shaft 35 and the tubular member 36, by rotation of a gear 43 keyed to said tubular member 36. The gear 43 is continuously in mesh with a rack 44 slidably supported in a bracket 45 secured to the plate 32 and attached to one end of the flexible wire 28, see Figs. 2 and 5. A spiral spring 46 attached to the tubular member 36 and the frame 30 continuously urges the pointer 37 in a counter-clockwise direction as viewed in Fig. 3. The dial 39 is provided with a stop 50 and is adapted to be oscillated between stops 51 and 52 on the disk 32 by mechanism hereinafter referred to. The stops 51 and 52 may be bent to vary the amount of oscillation or other means for adjusting the amount of movement of the dial 39 may be provided. A spring lever 54 carried by the disk 32 engages a projection 55 on the rear of the dial 39 and tends to hold the stop 50 in engagement with one or the other of the stops 51 and 52.

A short shaft 58 rotatably supported by the disks 31 and 32 directly above the shaft 35 carries a pawl 59, in the form of a rectangle provided with a pin 61, keyed thereto. The pin 61 engages the teeth in the gear 43 and is moved thereby to one side or the other of the centerline between the shafts 35 and 58 as said gear is rotated. The weight of the member 60 keeps the pin 61 in contact with the gear 43. The upper end of an inverted Y-member 62 keyed to the end of the shaft 58 adjacent the dial 39 is provided with an open slot 63 into which a pin 56 carried by the dial 39 projects. The two lower ends of the member 62 are weighted in such a manner that they tend to retain the pin 61 in mesh with the gear 43 and the dial 39 in a position with the stop 50 midway between the stops 51 and 52, but are not heavy enough to overcome the force of the spring 46 when the dial is held thereby in engagement with either stop 51 or 52.

Rotation of the gear 43 will move the pin 61 to one side of the centerline between the shafts 35 and 58, previously referred to, until the pin 61 no longer meshes with or projects between the teeth of said gear 43, after which the pawl 59 will ratchet over the gear teeth upon continued rotation thereof. Movement of the pin 61 to one side or the other of said centerline will move the dial 39 to engage the stop 50 with one or the other of the stops 51 and 52. After the dial 39 has been moved in one direction or the other it will be held stationary by the spring 54 until the direction of rotation of the gear 43 is reversed, and will not follow the vibrations of the pawl 59 as it ratchets on the teeth of the gear 43.

The operation of the device is as follows: The float 10 is moved up and down by variations in the gasoline level in the tank 9 rotating the sprocket wheel 13 and moving the flexible wire 28 through the gears 21 and 22 and the rack 24. Movement of the flexible wire 28 produces movement of the rack 44 which, in turn, rotates the gear 43 moving the pointer 37, and the dial 39 each time the direction of rotation of the gear 43 is reversed.

In the present embodiment of the invention the float 10 and the counterweight 11 are so balanced that one gallon of gasoline is required to build up sufficient weight in the float to overcome the load of the operating mechanism and as the float is moved by the second gallon added to or taken from the tank the pointer is moved an amount equal to one gallon and the dial also moved in the opposite direction an amount equal to one gallon, this compensating for the first gallon which produced no movement of the indicating mechanism.

From the foregoing description, it will be apparent that a new and improved gasoline gauge has been provided and I do not wish to be limited to the particular construction illustrated and described which may be varied within the scope of this invention, and I particularly point out and claim as my invention the following:

1. A liquid level indicator comprising a float, a flexible connection operatively connected to said float, a gauge comprising, a frame, a member rotatably supported by said frame, a dial rotatably supported by said frame, a pointer carried by said member, means operatively connected to said flexible connection for rotating said member upon movement of said float, and means operatively connected to said member for moving said dial.

2. A liquid level indicator comprising a float, a flexible connection operatively connected to said float, a gauge comprising a frame, a member rotatably supported by said frame, a dial rotatably supported by said frame, a pointer carried by said member, a gear keyed to said member, a rack in mesh with said gear slidably supported by said frame and operatively connected to said flexible connection, and means engaging said gear adapted to move said dial upon rotation thereof.

3. A liquid level indicator comprising a float, a flexible connection operatively connected to said float, a gauge comprising a frame, a member rotatably supported by said frame, a dial rotatably supported by said frame, a pointer carried by said member, means operatively connected to said flexible connection for oscillating said member upon movement of said float, and means operatively connected to said member for moving said dial during the initial movement of said member.

4. A liquid level indicator comprising a float, a flexible connection operatively connected to said float, a gauge comprising a frame, a member rotatably supported by said frame, a dial rotatably supported by said frame, a pointer carried by said member, a gear fixed to said member, a rack slidably supported by said frame, in mesh with said gear, means for operatively connecting said flexible connection and said rack for oscillating said gear upon movement of said float, and means engaging said gear adapted to move said dial during the initial movement of each oscillation of said gear.

5. A gauge of the character described comprising a frame, a member rotatably supported by said frame, a dial rotatably supported by said frame, a pointer fixed to said member, means for rotating said member, and means operatively connected to said member for moving said dial upon rotation thereof.

6. A gauge of the character described comprising a frame, a member rotatably supported by said frame, a dial rotatably supported by said frame, a pointer carried by said member and adapted to move over said dial, means for oscillating said member, and means operatively connected to said member for moving said dial during the initial movement of each oscillation.

GEORGE A. SZABO.